United States Patent
Prissok et al.

(10) Patent No.: US 9,850,360 B2
(45) Date of Patent: *Dec. 26, 2017

(54) HYBRID FOAM

(75) Inventors: Frank Prissok, Lemförde (DE); Steffen Mayer, Lembruch (DE); Tanja Aepker, Stemwede-Wehdem (DE); Maike Grever, Stemwede (DE); Daniela Kranzusch, Petershagen (DE); Marlene Niemann, Bohmte (DE); Florian Felix, Garmisch-Partenkirchen (DE)

(73) Assignee: BASF SE, Ludwigshafen (DE)

( * ) Notice: Subject to any disclaimer, the term of this patent is extended or adjusted under 35 U.S.C. 154(b) by 701 days.

This patent is subject to a terminal disclaimer.

(21) Appl. No.: 13/266,590

(22) PCT Filed: May 11, 2010

(86) PCT No.: PCT/EP2010/056406
§ 371 (c)(1),
(2), (4) Date: Oct. 27, 2011

(87) PCT Pub. No.: WO2010/130706
PCT Pub. Date: Nov. 18, 2010

(65) Prior Publication Data
US 2012/0059075 A1  Mar. 8, 2012

(30) Foreign Application Priority Data
May 11, 2009  (EP) .................................. 09159893

(51) Int. Cl.
*C08J 9/35* (2006.01)
*C08J 9/06* (2006.01)
*B29C 44/56* (2006.01)
*B29C 70/66* (2006.01)
*C08J 9/32* (2006.01)
*C08L 75/04* (2006.01)

(52) U.S. Cl.
CPC ............. *C08J 9/06* (2013.01); *B29C 44/5627* (2013.01); *B29C 70/66* (2013.01); *C08J 9/32* (2013.01); *C08L 75/04* (2013.01); *C08J 2203/22* (2013.01); *C08J 2205/06* (2013.01); *C08J 2375/04* (2013.01)

(58) Field of Classification Search
CPC ....... C08J 9/32; C08J 9/0095; B29C 44/5627; B29C 44/5636; B29C 44/7066
USPC ........................................................... 521/54
See application file for complete search history.

(56) References Cited

U.S. PATENT DOCUMENTS

| | | | |
|---|---|---|---|
| 6,479,560 B2 * | 11/2002 | Freitag et al. ................. 521/130 |
| 6,797,371 B1 * | 9/2004 | Gehlsen et al. ............ 428/317.5 |
| 7,202,284 B1 | 4/2007 | Limerkens et al. |
| 2003/0211308 A1 * | 11/2003 | Khandpur et al. ......... 428/317.3 |
| 2005/0027025 A1 * | 2/2005 | Erb et al. ......................... 521/50 |
| 2007/0142486 A1 | 6/2007 | Limerkens et al. |
| 2009/0001625 A1 * | 1/2009 | Newson et al. .............. 264/45.3 |
| 2011/0021652 A1 | 1/2011 | Mohmeyer et al. |
| 2012/0059075 A1 * | 3/2012 | Prissok et al. .................. 521/54 |
| 2012/0193286 A1 | 8/2012 | Prissok et al. |
| 2012/0297513 A1 * | 11/2012 | Prissok et al. ................... 2/2.15 |

FOREIGN PATENT DOCUMENTS

| | | |
|---|---|---|
| DE | 38 10 595 | 10/1989 |
| EP | 0 692 516 | 1/1996 |
| WO | 00 44821 | 8/2000 |
| WO | 2005 026243 | 3/2005 |

OTHER PUBLICATIONS

Boud. "Expancel Microspheres: An Introduction". Boud Minerals. Evidentiary Reference. Available at: http://www.boud.com/sites/default/files/u27/boud_minerals_-_introduction_to_expancel_thermoplastic_microspheres.pdf.*
International Search Report dated Feb. 9, 2011 in PCT/EP10/056406 Filed May 11, 2010.

* cited by examiner

*Primary Examiner* — Mike M Dollinger
(74) *Attorney, Agent, or Firm* — Oblon, McClelland, Maier & Neustadt, L.L.P.

(57) ABSTRACT

The invention relates to highly elastic polyurethane foams which are suitable as functional materials having thermally insulating properties.

15 Claims, No Drawings

HYBRID FOAM

JOINT RESEARCH AGREEMENT

The claimed invention was made by, on behalf of, and/or in connection with a joint research agreement between: Florian Felix and BASF Polyurethanes GmbH (formerly Elastogran GmbH). The agreement was in effect on and before the date the claimed invention was made, and the claimed invention was made as a result of activities undertaken within the scope of the agreement.

The invention relates to a hybrid foam based on a highly elastic thermoplastic polyurethane (TPU), a process for producing it and the use of the foam.

The use of soft, closed-celled and highly elastic functional materials based on chloroprene foams for the sports, shoe and clothing industry is known. Owing to an intrinsically good resilience in combination with the low density and closed-celled nature, such foams are used to a great extent in diving suits and surfing wetsuits, swimsuits and sea rescue wetsuits and also boots and other equipment in the marine sector. However, the production of chloroprene foams is complicated. In addition, chloroprene foams do not have a satisfactory light stability, for which reason they are preferably colored black, and have an only low tear strength and elongation at break.

Production of foams and polyurethane films based on TPU which have essentially closed pores is known. Thermoplastic polyurethane films which have essentially closed pores are known, for example, from DE 3810595 A1. They are produced by adding a blowing agent before production of the film and carrying out foaming by means of the blowing agent essentially only after formation of the thermoplastic polyurethane. The films obtained can be at least monoaxially stretched. EP 0 692 516 A1 discloses thermoplastic double foams in which a thermoplastic polyurethane is used as base composition, with at least two foaming processes which proceed separately from one another taking place, mainly by means of a chemical blowing agent and, in parallel thereto, by means of incorporated microballoons. WO 2005/026243 A1 discloses the use of expandable microspheres in the form of hollow microspheres comprising a thin polymer shell, with the spheres being filled with gas, generally with hydrocarbons, in expandable compositions based on TPU. To improve the mechanical properties of such systems, thermoplastic processing of a blend of a thermoplastic polyurethane with rubbers together with at least one blowing agent under conditions which lead to expansion of the blowing agent is known from WO 2005/026243 A1.

A disadvantage of the known foams is that their hardness and stiffness is frequently very high.

It was an object of the present invention to provide a foam which is highly elastic, has a high softness, preferably a matrix hardness in the Shore A range from 20 to 70, particularly preferably from 30 to 70, and preferably has a stress at 100% elongation of <0.5 MPa and at 200% elongation of <1 MPa, which is predominantly closed-celled and easy to produce and has improved resistance to visible and UV light.

The invention provides an elastic hybrid foam based on
a) at least one thermoplastic polyurethane (TPU),
b) hollow polymer bodies M which are filled with blowing agents and have a diameter of preferably not more than 200 μm, optionally
c) at least one additional chemical and/or physical blowing agent T, and optionally
d) auxiliaries and/or additives,
wherein the hybrid foam is at least monoaxially stretched, preferably from 100 to 500%, particularly preferably from 200 to 400%.

The term hybrid foam indicates that the foam comprises a TPU together with a different polymer in the form of hollow polymer bodies, preferably based on polystyrene or polyacrylonitrile or copolymers based on polystyrene or polyacrylonitrile. Preference is given to hollow polymer bodies M filled with blowing agents.

The invention further provides an elastic hybrid foam based on
a) at least one thermoplastic polyurethane (TPU),
b) hollow polymer bodies which are preferably hollow polymer bodies M filled with blowing agents, and optionally
c) at least one additional physical and/or chemical blowing agent T and optionally
d) auxiliaries and/or additives,
wherein the hollow polymer bodies M are neither physically nor chemically bound to the surrounding TPU in the elastic hybrid foam, i.e. are present separately from the TPU matrix. In preferred embodiments, the separation of the hollow polymer bodies which are filled with blowing agents is achieved by stretching. In other preferred embodiments, the separation is achieved by means of any other mechanical treatment of the TPU which makes it possible to separate the hollow polymer bodies from the TPU matrix without destroying the hollow polymer bodies. Further preferred methods for separation are ultrasonic treatment, thermal treatment such as heating and/or cooling, pressing of the hybrid foam, deflection over rollers having very small radii, twisting of the TPU sheets. In other preferred embodiments, the separation is achieved by use of release agents. All known methods are carried out separately in preferred embodiments or in all conceivable combinations in other preferred embodiments. Methods which are not mentioned here but make the separation of hollow polymer bodies and TPU possible are also comprised by the scope of the invention. As thermoplastic polyurethanes, it is possible to use the customary and known compounds as are described, for example, in Kunststoffhandbuch, volume 7 "Polyurethane", Carl Hanser Verlag, Munich, Vienna, 3rd edition 1993, pages 455 to 466.

Preference is given to using TPUs which have a melt index or MFR (melt flow rate; 190° C./3.8 kg; DIN EN 1133) of 1-350 g/10 min, preferably 20-150 g/10 min. However, the use of TPUs for expandable or expanded TPUs is not restricted to a particular MFR.

For the purposes of the present invention, thermoplastic polyurethanes can be plasticizer-free and plasticizer-comprising TPUs, in particular those having a content of 0-70% by weight, preferably from 0 to 50% by weight, based on the weight of the mixture, of customary plasticizers. Possible plasticizers are the compounds known in general for this purpose, e.g. phthalates, citrates, for example esters of citric acid, e.g. tributylacetyl citrate and benzoates.

The preparation of the TPUs is carried out by customary processes by reacting diisocyanates A) with compounds having at least two hydrogen atoms which are reacted toward isocyanate groups, preferably bifunctional alcohols, in particular polyols B) and chain extenders C).

As diisocyanates A), it is possible to use the customary aromatic, aliphatic and/or cycloaliphatic diisocyanates, preferably diphenylmethane diisocyanate (MDI), tolylene diisocyanate (TDI), trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, dicyclohexylmethane 4,4'-, 2,4'- and/or 2,2'-diisocyanate, diphenylmethane diisocyanate (MDI) is particularly preferred.

As compounds B) which are reactive toward isocyanates, it is possible to use generally known polyhydroxyl compounds which have number average molecular weights of from 500 to 8000, preferably from 600 to 6000, in particular from 800 to 4000, and preferably have an average functionality of from 1.8 to 2.6, preferably from 1.9 to 2.2, in particular 2, polyesterols, polyetherols and/or polycarbonatediols are preferred. Preferred polyester diols can be obtained by reacting ethanediol, butanediol or hexanediol as diol with adipic acid as dicarboxylic acid, with the diols being able to be used either individually or as a mixture. Preference is given to, for example, a weight ratio of butanediol to hexanediol of 2:1 or a weight ratio of butanediol to ethanediol of 1:1. Preference is also given to polyether polyol having a number average molecular weight of from 750 to 2500 g/mol, preferably from 1000 to 2000 g/mol. Particular preference is given to polytetrahydrofuran having a number average molecular weight of from 1000 to 2000 g/mol.

As chain extenders C), it is possible to use generally known compounds, preferably diamines and/or alkanediols having from 2 to 10 carbon atoms in the alkylene radical, in particular ethylene glycol and/or 1,4-butanediol and/or hexanediol, and/or dioxyalkylene glycols and/or trioxyalkylene glycols having from 3 to 8 carbon atoms in the oxyalkylene radical, preferably corresponding oligopolyoxypropylene glycols, with mixtures of the chain extenders also being used in some preferred embodiments. Use is also made of 1,4-bis(hydroxymethyl)benzene (1,4-BHMB), 1,4-bis(hydroxyethyl)benzene (1,4-BHEB) or 1,4-bis(2-hydroxyethoxy)benzene (1,4-HQEE) as preferred chain extenders. Preference is further given to using ethylene glycol, propanediol, butanediol and hexanediol, particularly preferably ethylene glycol and butanediol, as chain extenders.

It is preferred to use catalysts which accelerate the reaction between the NCO groups of the diisocyanates and the hydroxyl groups of the isocyanate-reactive components, preferably tertiary amines such as triethylamine, dimethylcyclohexylamine, N-methylmorpholine, N,N'-dimethylpiperazine, 2-(dimethylaminoethoxy)ethanol, diazabicyclo[2.2.2]octane and the like, and also, in particular, organic metal compounds such as titanic esters, iron compounds, preferably iron(III) acetylacetonate, tin compounds, preferably tin diacetate, tin dilaurate or the dialkyltin salts of aliphatic carboxylic acids, preferably dibutyltin diacetate, dibutyltin dilaurate or the like. The catalysts are preferably used in amounts of from 0.0001 to 0.1 parts by weight per 100 parts by weight of polyhydroxyl compound.

Apart from catalysts, preferably auxiliaries are also added to the components. Preferred auxiliaries are surface-active substances, flame retardants, nucleating agents, lubricants and mold release agents, dyes and pigments, inhibitors, stabilizers against hydrolysis, light, heat, oxidation or discoloration, agents for protection against microbial degradation, inorganic and/or organic fillers, reinforcing materials and plasticizers.

As flame retardants, it is generally possible to use the flame retardants known from the prior art. Suitable flame retardants are, for example, brominated ethers (Ixol B 251), brominated alcohols such as dibromoneopentyl alcohol, tribromoneopentyl alcohol and PHT-4-diol, and also chlorinated phosphates such as tris(2-chloroethyl) phosphate, tris(2-chloroisopropyl) phosphate (TCPP), tris(1,3-dichloroisopropyl) phosphate, tris(2,3-dibromopropyl) phosphate and tetrakis(2-chloroethyl) ethylenediphosphate, or mixtures thereof.

Apart from the abovementioned halogen-substituted phosphates, it is also possible to use inorganic flame retardants such as red phosphorus, preparations comprising red phosphorus, expandable graphite, aluminum oxide hydrate, antimony trioxide, arsenic oxide, ammonium polyphosphate and calcium sulphate or cyanuric acid derivatives such as melamine or mixtures of at least two flame retardants such as ammonium polyphosphates and melamine and also optionally starch for making the rigid polyurethane foams produced according to the invention flame resistant.

As further liquid halogen-free flame retardants, it is possible to use diethyl ethanephosphonate (DEEP), triethyl phosphate (TEP), dimethyl propylphosphonate (DMPP), diphenyl cresyl phosphate (DPC) and others.

The flame retardants can be used in all customary amounts. When flame retardants are used, they are preferably used in an amount of from 1 to 50% by weight, based on the total weight of thermoplastic polyurethane.

The molecular weight is preferably adjusted by means of monofunctional compounds which are reactive toward isocyanate, further preferably by monoalcohols.

The TPUs are usually produced by customary processes, preferably by means of belt units or reaction extruders.

The hollow polymer bodies M which are filled with blowing agent are preferably based on a polymer which has a lower polarity than the TPU used. They are preferably based on polystyrene or styrene-acrylonitrile polymers (SAN). In a preferred embodiment, expandable microspheres are used as hollow polymer bodies M filled with blowing agent. Expandable microspheres are hollow microspheres which are composed of a thin polymer shell preferably of polyacrylonitrile or copolymers thereof. These hollow microspheres are filled with gas or low-boiling liquids, preferably hydrocarbons. The temperature prevailing in thermoplastic processing results in softening of the polymer shell and at the same to expansion of the enclosed gas. This results in expansion of the microspheres. The expansion capability of the microspheres can be described by determination of the TMA density [$kg/m^3$] (Stare Thermal Analysis System from Mettler Toledo; heat rate 20° C./min). The TMA density is the minimum density which can be achieved at a particular temperature $T_{max}$ under atmospheric pressure before the microspheres collapse.

The hollow polymer bodies M which are filled with blowing agents and are used according to the invention preferably have a diameter of from 20 µm to 40 µm. Such hollow polymer bodies M which are filled with blowing agent can be obtained, for example, from Akzo Nobel, Casco Products GmbH, Essen, under the trade name Expancel®.

Preference is given to these hollow polymer bodies remaining closed under the production conditions and more than 80%, preferably more than 90%, more preferably more than 95%, of the hollow polymer bodies M used expanding to a size of less than 200 µm.

It has been found surprisingly that a particularly fine cell structure, a suppression of void formation and no formation of sink marks is observed when hollow polymer bodies M which are filled with blowing agent and having a TMA density of less than 10 $kg/m^3$, preferably 2-10 $kg/m^3$ and particularly preferably 2-7 $kg/m^3$, are used in powder form or masterbatch form and, in addition, the processing range, for example in respect of temperature, is significantly greater, so that microspheres having such a TMA density are particularly preferred. In a further preferred embodiment, the hollow polymer bodies M filled with blowing agents have a bimodal particle size distribution. The particle sizes are selected so that a very optimal filling of space by the expanded particles is possible and a very low density of the hybrid foam of the invention is thus obtained.

The content of hollow polymer bodies M which are filled with blowing agent in the mixture depends on the desired density of the expanded TPUs. Preference is given to using from 1 part by weight to 20 parts by weight, preferably from 2 parts by weight to 10 parts by weight, of the expandable hollow polymer bodies M which are filled with blowing agent according to the invention per 100 parts by weight of the TPU or TPU blend to be expanded, i.e. to be foamed.

Particular preference is given to hybrid foams according to the invention which, based on the total weight of thermoplastic polyurethane (TPU), hollow polymer bodies M filled with blowing agents and chemical or physical blowing agent T preferably used in the production process, which add up to 100% by weight, are based on from 75% by weight to 99% by weight, preferably from 80% by weight to 98% by weight, particularly preferably from 87% by weight to 97% by weight, of TPU, from 1% by weight to 20% by weight, preferably from 2% by weight to 12% by weight of hollow polymer bodies M which are filled with blowing agent and from 0 to 5% by weight, preferably from 0.1% by weight to 3% by weight, of chemical or physical blowing agent T. In this calculation, only the weight of the thermoplastic polymer derived from isocyanates A), compounds having at least two hydrogen atoms which are reactive toward isocyanates B) and chain extenders C) are taken into account; any further polymers present or customary auxiliaries and/or additives such as UV inhibitors, flame retardants, fillers or plasticizers are not taken into account in this calculation. Preference is given to setting a density of from 50 to 500 g/l, particularly preferably from 100 to 300 g/l and in particular from 110 to 200 g/l.

A microsphere batch preferably comprises from 5% by weight to 90% by weight, preferably from 25% by weight to 70% by weight, of microspheres and from 10% by weight to 95% by weight, preferably from 30% by weight to 75% by weight, of carriers, preferably thermoplastic carriers, preferably EVA (ethylene-vinyl acetate).

In a further preferred embodiment, micropelletized polystyrene bodies loaded with blowing agent, which preferably have a maximum diameter of 150 µm, are used as hollow polymer bodies M filled with blowing agent. These particles are known and are usually used to produce expanded polystyrene (EPS).

Furthermore, appropriate additives, also referred to as auxiliaries, can be added to the TPU and/or the hollow polymer bodies M in order to improve further properties, for example absorbers for protection against UV and visible light, flame retardants and plasticizers.

In a further preferred embodiment, a release agent is added to the TPU and/or preferably the hollow polymer bodies M filled with blowing agent before mixing with the TPU in order to reduce adhesion between the hollow bodies M and the TPU, in particular during and after stretching. As release agents, it is possible to use customary substances as are mentioned, for example, in "Kunststoffhandbuch, volume 7, Polyurethane", Carl Hanser Verlag, 3rd edition 1993, chapter 3.4.9. Particular preference is given to using waxes, fats and/or oils as release agents. In a particularly preferred embodiment, additional chemical and/or physical blowing agents T which are not enclosed in polymer bodies are used in addition to the blowing agents used in the hollow polymer bodies M. The chemical blowing agents referred to here are such substances which release gases on thermal decomposition when hybrid foams according to the invention are produced, preferably hydrogencitrates, hydrogencarbonates or azodicarboxamides, e.g. Celegoene®, Tracel®, Hydrocerol®. By physical blowing agents are meant substances, preferably liquids which do not react, which vaporize during the production of the hybrid foam of the invention.

In a preferred embodiment, only at least one chemical blowing agent is used; in another preferred embodiment, only at least one physical blowing agent is used and in a third preferred embodiment, both at least one chemical blowing agent and at least one physical blowing agent are used.

Particular preference is given to using a combination of sodium hydrogencitrate and sodium hydrogencarbonate as blowing agent T. The chemical and/or physical blowing agents are preferably also made up to form a masterbatch in thermoplastic carriers, for example EVA (ethylene-vinyl acetate). In one embodiment, made up to form a batch of blowing agent T means that a concentrate of the chemical and/or physical blowing agent T in a thermoplastic carrier is prepared and the blowing agent T is then added in this form in/for the production of the hybrid foam.

To produce the hybrid foams of the invention, the TPU and the hollow polymer bodies M filled with blowing agent and also, optionally, the additional blowing agent T, optionally as a batch, are mixed and thermoplastically processed to produce the desired shaped bodies. This can be effected, for example, by means of injection molding, sintering or extrusion. The temperature during thermoplastic processing results in expansion of the expandable microspheres and thus to formation of the expanded TPUs. The melt is preferably continuously brought into the desired shaped and solidified or recrystallized.

Mixing of the TPU or TPU blend with the hollow polymer bodies M can be carried out in simple polymer granule mixers such as tumble mixers with or without prior application of 0.05-2% of binder, e.g. paraffin or mineral oil. Mixing of the TPU or TPU blend with masterbatches of the hollow polymer bodies M can likewise be carried out in simple polymer granule mixers, preferably tumble mixers, mechanically or by hand in simple plastic boxes, to give a dry blend. TPU, hollow polymer bodies M and blowing agents T are preferably also metered separately into the processing machine by means of suitable metering devices.

The hollow polymer bodies M filled with blowing agent are, in a preferred embodiment, added to the TPU after it has been produced. However, it is also possible to add the hollow polymer bodies M to the appropriate starting components during formation of the TPU. After the TPU has been mixed with the hollow polymer bodies M and, if used, the additional blowing agent T, the TPU is foamed, preferably in or directly after the end segment of the mixing apparatus, preferably in the die of the extruder or after exit.

In a particularly preferred embodiment of the process of the invention, the hollow polymer bodies M filled with blowing agent are mixed with the thermoplastic polyurethane TPU directly in the plant in which thermoplastic processing is carried out. Here, any additional blowing agent T is preferably introduced into the plasticizing unit of the processing machine.

The hybrid foam according to the invention can be obtained, depending on the design of the extruder which is preferably used, as, for example, strand, tubing, film, sheet or block.

The temperature in the reaction apparatus, preferably in the extruder, is, in a preferred embodiment, selected so that the hollow polymer bodies M soften and expand in the die or immediately after the machine outlet and that it is, optionally, above the decomposition point of the optionally added blowing agent T, it is preferably above the vaporization temperature of the blowing agent T. In a preferred embodiment, the melt is initially prevented from foaming or allowed to foam to only a slight extent by setting of a high counterpressure in the extruder. As a result of decreasing counterpressure and appropriate temperatures in the end zones of the extruder, in preferred embodiments full foaming is achieved in these end zones or on exit. In a preferred embodiment, the density range of the foam obtained in this processing step is from about 50 g/l to 500 g/l, preferably from 100 g/l to 300 g/l and in particular from 110 g/l to 200 g/l.

According to the invention, the foam is at least monoaxially stretched by at least 10%, preferably 100-500%, particularly preferably 200-400%. Stretching (in the literature sometimes also referred to synonymously as "orientation") is carried out in a manner known per se. The foam is particularly preferably stretched biaxially, for example at an angle of from 60 to 120°, particularly preferably from 80 to 100°. Here, stretching along both axes is preferably carried out in a ratio of from 2:1 to 5:1 and transverse stretching is carried out in a ratio of from 2:1 to 5:1. Particular preference is given to carrying out stretching of from 3:1 to 5:1.

Stretching can preferably be carried out on the following apparatuses: longitudinal stretchers, transverse stretchers, longitudinal/transverse stretchers, diamond stretchers, rolling stretchers. It is preferably carried out at a temperature below the softening temperature of the polymers and below the foaming temperature of the blowing agents, in a preferred embodiment of the at least one blowing agent.

It has surprisingly been found that after stretching, in particular when using blowing agent T, a very soft, highly elastic material is obtained which has excellent resilience. The hollow polymer bodies M are then preferably present in the form of closed-celled spheres in the TPU matrix. In a preferred embodiment, there is no or only slight adhesion between the TPU and the hollow bodies M after stretching.

The elastic hybrid foam according to the invention has, in a preferred embodiment, an elongation at break of at least 200%, particularly preferably of from about 700% to 1000%, with the measurement being carried out in accordance with DIN 53504. After stretching, no great application or force is necessary to effect elongation even in the initial region but instead the foam has a virtually linear force/elongation curve up to the region of up to preferably 500%, i.e. the deviation of the force-elongation curve from the line which connects the force at 500% elongation to the origin of the coordinate system is not more than 10% of the force value at 500% elongation. Here, the hybrid foam of the invention preferably displays a stress at 100% elongation of less than 0.5 MPa and at 200% elongation of less than 1 MPa, particularly preferably less than 0.25 MPa at 100% elongation and less than 0.35 MPa at 200% elongation. Furthermore, the hybrid foam of the invention preferably has an elongation at yield of at least 150%, particularly preferably 200% and in particular 250%. Here, the "elongation at yield" is the elongation at which a maximum deformation of 0.2% remains after the stress is released. In a preferred embodiment, deformation is the increase in the length in the direction of elongation, based on the length before elongation.

The foams of the invention have a soft, highly elastic matrix and a substantially closed-celled structure. Here, closed-cell means essentially that more than 60% of the cells are closed. In a preferred embodiment, at least 80% of the microspheres are present as closed cells.

The hybrid foam of the invention preferably has a Shore A hardness of less than 75, particularly preferable less than 70. The TPU used for production of the hybrid foam preferably has a Shore A hardness in the range from 15 to 75, more preferably from 20 to 70.

In a particularly preferred embodiment, the elastic hybrid foam of the invention is covered at least on one side with a woven fabric, preferably a woven textile, for example by adhesive bonding or lamination into the as yet uncured material.

The hybrid foam of the invention can then be processed, for example by welding, to give the final article, for example a piece of clothing.

The foams according to the invention are suitable, in particular, as functional materials in the sports, shoe and clothing industry for producing thermally insulating articles. Apart from a low hardness and excellent elongation behaviour, the hybrid foams of the invention display excellent insulation behavior, excellent UV stability, a pleasant feel on being touched and high resistance to hydrolysis and aging phenomena, for example the loss of mechanical properties, in particular in salted water. The high UV resistance in particular also makes uses of light-coloured or white hybrid foams possible where they are exposed to UV. Owing to the thermoplastic properties, the hybrid foam of the invention can also be processed without seams. Possible uses are therefore all types of pieces of clothing intended for use in water and adjacent to water, e.g. surfing suits, diving suits, swimming suits, and also gloves, head coverings and ankle socks. The present invention therefore also provides such a piece of clothing. If flame retardant is present, the materials according to the invention can also be used as sea rescue suits. Apart from use in the clothing industry, the hybrid foams of the invention can be used, for example, in the interior furnishing of transport means, for example cars and aircraft, for example as wall or door cladding, armrests, gear knob or dashboard, or in the furniture industry. Furthermore, the articles according to the invention can also be used as thermally insulating and shock-damping packaging or sometimes casings of articles, for example for electronic appliances such as laptops and cell phones. In this application, the high extensibility of the material and the seamless processing are especially advantageous, as a result of which the material does not have to be taken off for use when flipping open, for example, a cell phone or computer.

EXAMPLES

| Starting materials | |
|---|---|
| Isocyanate 1: | 4,4'-Diisocyanatodiphenylmethane |
| Polyol 1: | Polytetrahydrofuran having an OH number of 56 |
| Polyol 2: | Polytetrahydrofuran having an OH number of 112 |
| Polyol 3: | Polyesterol based on adipic acid, butanediol and ethanediol (1:1) and having an OH number of 56 |
| KE1: | 1,4-Butanediol |
| Plast1: | Dipropylene glycol dibenzoate (plasticizer) |
| TPUad1: | TPU based on polyesterol (adipic acid, butanediol) having an OH number of 46, 1,4-butanediol, 4,4'-diisocyanatodiphenylmethane and having a Shore A hardness of 95 |

-continued

| | |
|---|---|
| Stab1: | Sterically hindered phenol (antioxidant) |
| Stab2: | Polymer carbodiimide (hydrolysis stabilizer) |
| Stab3: | Antioxidant concentrate in TPU |
| UV1: | Benzotriazole derivatives (UV stabilizer) |
| Wax1: | Bisstearylamide (lubricant) |
| Wax2: | Lubricant concentrate in TPU |
| Blow1: | Concentrate of sodium hydrogencitrate (32%) and sodium hydrogencarbonate (24%) in ethylene-vinyl acetate copolymer (EVA) |
| Polymer1: | PS/SAN microspheres in EVA |

The abbreviations here have the following meanings

| | |
|---|---|
| KE: | Chain extender |
| PS: | Polystyrene |
| SAN: | Styrene-acrylonitrile |

The TPUs 1 to 3 shown in table 1 are produced from the starting materials.

TABLE 1

| | TPU 1 (parts by weight) | TPU 2 (parts by weight) | TPU 3 (parts by weight) |
|---|---|---|---|
| Polyol 1 | 34.24 | | |
| Polyol 2 | 34.24 | | |
| Polyol 3 | | 50.74 | 49.41 |
| Isocyanate 1 | 25.47 | 19.28 | 8.42 |
| KE1 | 4.52 | 4.57 | 0.54 |

TABLE 1-continued

| | TPU 1 (parts by weight) | TPU 2 (parts by weight) | TPU 3 (parts by weight) |
|---|---|---|---|
| Plast1 | | 25.00 | 16.70 |
| TPUad1 | | | 21.18 |
| Stab1 | 1.00 | | |
| Stab2 | | 0.41 | |
| Stab3 | | | 1.67 |
| UV1 | 0.50 | | |
| Wax2 | | | 1.25 |

General Method For Production of the TPUs

The polyols (polyol 1-3) were admixed with KE1 while stirring. After subsequent heating of the solution to 80° C., isocyanate 1 and optionally the additives indicated in the formulations were added and the mixture was stirred until a homogeneous solution was obtained. The reaction mixture heated up and was then poured onto a heated, Teflon-coated table. The cast sheet was heated at 110° C. for 12 hours and subsequently granulated.

Extrusion

In the comparative examples C1-C3, the TPUs 1-3 obtained were in each case admixed with 0.5% by weight of Wax1 and processed on a Brabender single-screw extruder to give strands.

In examples B1-B3 according to the invention, the TPUs 1-3 obtained were likewise in each case mixed with 0.5% by weight of Wax1 and also 2.5% by weight of Blow1 and 7.5% by weight of Polymer1 and extruded as a dry blend using the following extruder:

Extruder: Brabender Plasti-Corder PLE 331
L/D ratio: L=25 D
Screw diameter: D=19 mm
Compression ratio of the screw: 3:1
Die: round die
Type of extrusion: strand More precise extrusion conditions are shown in table 2 below:

TABLE 2

| No. | Composition | Temperature profile [° C.] | | | | Rot. Sp. [rpm] | Torque [Nm] | Remarks |
|---|---|---|---|---|---|---|---|---|
| | | Z 1 | Z 2 | Z 3 | Z 4 | | | |
| C1 | TPU1 + 0.5% of Wax1 | 190 | 190 | 190 | 190 | 15 | 18 | Compact, homogeneous strand |
| C2 | TPU2 + 0.5% of Wax1 | 170 | 175 | 175 | 170 | 25 | 30 | Compact, homogeneous strand |
| C3 | TPU3 + 0.5% of Wax1 | 150 | 160 | 155 | 150 | 17 | 17 | Compact, homogeneous strand |
| E1 | TPU1 + 7.5% of Polymer1 + 2.5% of Blow1 + 0.5% of Wax1 | 165 | 170 | 170 | 160 | 40 | 33 | Foamed, homogeneous strand |
| E2 | TPU2 + 7.5% of Polymer1 + 2.5% of Blow1 + 0.5% of Wax1 | 160 | 165 | 165 | 160 | 40 | 15 | Foamed, very homogeneous strand |
| E3 | TPU3 + 7.5% of Polymer1 + 2.5% of Blow1 + 0.5% of Wax1 | 150 | 160 | 155 | 150 | 40 | 10 | Foamed, very homogeneous strand |

Rot. Sp. = rotational speed,
Torque = torque on the screw

Mechanical properties of the TPUs used without stretching according to the invention and without addition of microspheres (Polymer 1) measured on injection-molded plates are shown in table 3.

TABLE 3

| Experiment | | C1 | C2 | C3 |
|---|---|---|---|---|
| TPU | | TPU1 | TPU2 | TPU3 |
| Density | [g/cm3] | 1.08 | 1.19 | 1.18 |
| Hardness | [Shore A] | 73 | 62 | 39 |
| Tensile strength | [MPa] | 36 | 39 | 17 |

TABLE 3-continued

| Experiment | | C1 | C2 | C3 |
|---|---|---|---|---|
| Elongation at break | [%] | 830 | 1030 | 1260 |
| Tear propagation resistance | [N/mm] | 45 | 42 | 35 |

Hardness: DIN 53505
Tensile strength, elongation at break and stress: DIN 53504
Tear propagation resistance: DIN ISO 34-1, B (b)
Density: DIN 53479

Mechanical properties of the TPUs according to the invention measured on prestretched strand sections foamed according to the invention by methods based on the DIN standards are shown in table 4:

TABLE 4

| Experiment | | E1 | E2 | E3 | E3 |
|---|---|---|---|---|---|
| TPU | | TPU1 | TPU2 | TPU3 | TPU3 |
| Stretching | | 200% pre-stretching | 200% pre-stretching | 200% pre-stretching | 400% pre-stretching |
| Density | [g/cm³] | 0.222 | 0.155 | 0.225 | 0.225 |
| Tensile strength | [MPa] | 3.1 | 1.4 | 1.5 | 1.5 |
| Stress at 100% | [KPa] | 480 | 320 | 280 | 210 |
| Stress at 200% | [KPa] | 860 | 540 | 480 | 340 |
| Stress at 300% | [KPa] | 1090 | 550 | 590 | 550 |
| Elongation at break | [%] | 820 | 750 | 850 | 790 |

The advantageous properties of the stretched TPUs according to the invention, namely low density, ready elongation, i.e. only little force has to be applied in order to elongate the specimens, can be seen from the values in table 4.

The invention claimed is:

1. An elastic hybrid foam, comprising:
   a) at least one thermoplastic polyurethane having Shore A hardness of 20 to 70;
   b) at least one hollow polymer body having a TMA density of 2-10 kg/m³;
   c) optionally at least one additional physical blowing agent, chemical blowing agent, or both; and
   d) optionally, at least one auxiliary and at least one additive,
   wherein the hybrid foam is at least monoaxially stretched,
   wherein said hybrid foam is has a substantially closed-celled structure, and
   wherein said hybrid foam has a stress at 100% elongation of less than 0.25 MPa and at 200% elongation of less than 0.35 MPa.

2. The hybrid foam of claim 1, which is biaxially stretched.

3. An elastic hybrid foam, comprising:
   a) at least one thermoplastic polyurethane having Shore A hardness of 20 to 70;
   b) at least one hollow polymer body having a TMA density of 2-10 kg/m³;
   c) optionally additional physical blowing agent, chemical blowing agent, or both; and
   d) optionally, at least one auxiliary, at least one additive, or both,
   wherein the at least one hollow polymer body is neither physically nor chemically bound to the surrounding thermoplastic polyurethane,
   wherein said hybrid foam is has a substantially closed-celled structure, and
   wherein said hybrid foam has a stress at 100% elongation of less than 0.25 MPa and at 200% elongation of less than 0.35 MPa.

4. The hybrid foam or claim 1, wherein the foam comprises from 1 to 20% by weight of the hollow polymer body filled with at least one blowing agent and from 0 to 5% by weight of the physical blowing agent, chemical blowing agent, or both, based on a total weight of the thermoplastic polyurethane, the hollow polymer body filled with at least one blowing agent, and the physical blowing agent, chemical blowing agent, or both, which add up to 100% by weight based on from 75 to 99% by weight of the thermoplastic polyurethane.

5. The hybrid foam of claim 1, wherein an elongation at break in accordance with DIN 53504 is at least 200%.

6. The hybrid foam of claim 1, wherein the thermoplastic polyurethane comprises a release agent.

7. The hybrid foam of claim 1, wherein the thermoplastic polyurethane comprises a plasticizer.

8. The hybrid foam of claim 1, wherein at least 80% of the cells making up the hybrid foam are closed.

9. The hybrid foam of claim 1, wherein the hollow polymer body is filled with at least one blowing agent.

10. The hybrid foam of claim 1, wherein the hybrid foam is at least monoaxially stretched in a ratio of at least 2:1.

11. The hybrid foam of claim 3, wherein the hollow polymer body is filled with at least one blowing agent.

12. The hybrid foam of claim 7, wherein the plasticizer is at least one selected from the group consisting of a phthalate, a benzoate, a glycerol ester, and an ester of citric acid.

13. The hybrid foam of claim 8, wherein the foam cells have a cell diameter of less than 200 μm.

14. The hybrid foam of claim 1, wherein the at least one hollow polymer body having a TMA density of 2-7 kg/m³.

15. The hybrid foam of claim 3, wherein the at least one hollow polymer body having a TMA density of 2-7 kg/m³.

* * * * *